(12) United States Patent
Manas (10) Patent No.: US 11,573,819 B2
(45) Date of Patent: Feb. 7, 2023

(54) COMPUTER-IMPLEMENTED METHOD FOR REDUCING SERVICE DISRUPTION TIMES FOR A UNIVERSAL CUSTOMER PREMISE EQUIPMENT, UCPE, DEVICE WITH RESOURCE CONSTRAINT IN A NETWORK FUNCTIONS VIRTUALIZATION, NFV, NETWORK INFRASTRUCTURE

(71) Applicant: ADVA Optical Networking SE, Meiningen OT Dreissigacker (DE)

(72) Inventor: Mal Manas, Bangalore (IN)

(73) Assignee: ADVA OPTICAL NETWORKING SE, Meiningen-Dreissigacker (DE)

(*) Notice: Subject to any disclaimer, the term of this patent is extended or adjusted under 35 U.S.C. 154(b) by 0 days.

(21) Appl. No.: 17/154,760

(22) Filed: Jan. 21, 2021

(65) Prior Publication Data

US 2021/0240511 A1    Aug. 5, 2021

(30) Foreign Application Priority Data

Feb. 4, 2020   (EP) .................................. 20155266

(51) Int. Cl.
G06F 9/455       (2018.01)
H04L 41/5054     (2022.01)

(52) U.S. Cl.
CPC ...... G06F 9/45558 (2013.01); H04L 41/5054 (2013.01); *G06F 2009/4557* (2013.01); *G06F 2009/45595* (2013.01)

(58) Field of Classification Search
CPC .... G06F 9/5011; G06F 9/5072; G06F 9/5016; G06F 2009/4557; G06F 9/5022;
(Continued)

(56) References Cited

U.S. PATENT DOCUMENTS 9,384,028 B1 * 7/2016 Felstaine ............... H04L 45/586
9,645,899 B1 * 5/2017 Felstaine ............. G06F 11/2025
(Continued)

FOREIGN PATENT DOCUMENTS

EP          3 300 298 A1   3/2018
WO    WO 2018/108278 A1   6/2018

OTHER PUBLICATIONS

Communication of the Extended European Search Report for European Patent Application Serial No. 20155266.8 (dated Jun. 29, 2020).

(Continued)

*Primary Examiner* — Frantz B Jean
(74) *Attorney, Agent, or Firm* — Jenkins, Wilson, Taylor & Hunt, P.A.

(57) ABSTRACT

A computer-implemented method for reducing service disruption times in a network functions virtualization, NFV, network infrastructure includes at least one universal customer premise equipment, uCPE, having hardware resources used for running virtual network functions, VNFs, on virtual machines, VMs. In response to a request for substituting an implemented virtual network function, VNF, linked to other virtual network functions, VNFs, in a VNF service chain by another substitution VNF resource allocation ratios of available hardware resources of the universal customer premise equipment, uCPE, are automatically increased from a default value by oversubscription to provide the hardware resources required by the substitution VNF.

11 Claims, 6 Drawing Sheets

(58) Field of Classification Search
CPC ....... G06F 9/45558; G06F 2009/45595; H04L 41/5054
See application file for complete search history.

(56) References Cited

U.S. PATENT DOCUMENTS

| | | | |
|---|---|---|---|
| 10,862,760 B2* | 12/2020 | Caldwell | H04L 41/40 |
| 10,999,147 B2* | 5/2021 | Celozzi | H04L 41/40 |
| 11,169,840 B2* | 11/2021 | Miller | H04L 41/0895 |
| 11,218,364 B2* | 1/2022 | Shevade | H04L 41/0806 |
| 2017/0272523 A1* | 9/2017 | Cillis | H04L 41/5048 |
| 2018/0060134 A1 | 3/2018 | Bianchini et al. | |
| 2018/0367418 A1* | 12/2018 | Dravid | H04L 47/803 |
| 2020/0004601 A1 | 1/2020 | Ahmad et al. | |
| 2021/0119866 A1* | 4/2021 | Premnath | H04L 41/122 |

OTHER PUBLICATIONS

"Overview and code dive showing how disk_available_least is calculated," GitHub, https://gist.github.com/JCallicoat/43505cab0535057ca4fb, pp. 1-8 (2019).

"Introduce Dynamic Service Chaining by Using SDN & NFV Technologies," Reply Sytel, www.reply.com, pp. 1-6 (2019).

Savi et al. ,"Impact of Processing-Resource Sharing on the Placement of Chained Virtual Network Functions," 2019 IEEE, arXiv:1710.08262v5, pp. 1-14 (Sep. 30, 2019).

Office Action for European Patent Application Serial No. 20 155 266.8 (dated Jul. 28, 2022).

\* cited by examiner

| Name | Diskspace (GB) | | | | | CPU | | | | | RAM (MB) | | | | |
|---|---|---|---|---|---|---|---|---|---|---|---|---|---|---|---|
| | Grant | Rogue | Available | Total | Used | Grant | Rogue | Available | Total | Used | Grant | Rogue | Available | Total | Used |
| CA142 | 0 | 0 | 0 | 0 | NaN% | 0 | 0 | 0 | 0 | NaN% | 0 | 0 | 0 | 0 | NaN% |
| CA5 | 0 | 11 | 105 | 116 | 9% | 0 | 0 | 2 | 2 | 0% | 0 | 7866 | 7988 | 15854 | 50% |
| Cloud_150 | 350 | 91 | 140 | 581 | 76% | 14 | 0 | 0 | 14 | 100% | 6144 | 8573 | 49664 | 64381 | 23% |

FIG 4A

```
[newton_ctrl@CA150 /]$ openstack hypervisor stats
+---------------------+--------+
| Field               | Value  |
+---------------------+--------+
| count               | 1      |
| current_workload    | 0      |
| disk_available_least| 140    |
| free_disk_gb        | 231    |
| free_ram_mb         | 49664  |
| local_gb            | 581    |
| local_gb_used       | 350    |
| memory_mb           | 64381  |
| memory_mb_used      | 14717  |
| running_vms         | 2      |
| vcpus               | 14     |
| vcpus_used          | 14     |
+---------------------+--------+
```

FIG 4B

```
[newton_ctrl@CA150 /]$ openstack hypervisor stats
+---------------------+--------+
| Field               | Value  |
+---------------------+--------+
| count               | 1      |
| current_workload    | 0      |
| disk_available_least| 431    |
| free_disk_gb        | 522    |
| free_ram_mb         | 49664  |
| local_gb            | 871    |
| local_gb_used       | 350    |
| memory_mb           | 64381  |
| memory_mb_used      | 14717  |
| running_vms         | 2      |
| vcpus               | 28     |
| vcpus_used          | 14     |
+---------------------+--------+
```

COMPUTER-IMPLEMENTED METHOD FOR REDUCING SERVICE DISRUPTION TIMES FOR A UNIVERSAL CUSTOMER PREMISE EQUIPMENT, UCPE, DEVICE WITH RESOURCE CONSTRAINT IN A NETWORK FUNCTIONS VIRTUALIZATION, NFV, NETWORK INFRASTRUCTURE

PRIORITY CLAIM

This application claims the priority benefit of European Patent Application Number 20155266.8, filed Feb. 4, 2020, the disclosure of which is incorporated herein by reference in its entirety.

Network functions virtualization, NFV, refers to the process of separating network functions from hardware to create a virtualized network which can run on commodity hardware. Network functions virtualization, NFV, uses virtual network functions VNFs which can handle specific network functions like firewalls or load balancing. Virtual network functions VNFs are virtualized tasks formally carried out by proprietary dedicated hardware. Virtual network functions VNFs move individual network functions out of dedicated hardware devices into software that can run on commodity hardware. Virtual network functions VNFs can be linked together like building blocks in a process known as service chaining. Network service chaining capabilities means that a large number of virtual network functions VNFs can be connected together in a NFV environment. Because this is done in software using virtual circuits these connections can be set up and torn down as required with a service chain provisioning through a NFV orchestration layer. Individual virtual network functions VNFs can be connected or combined together as building blocks to create a fully virtualized environment. Virtual network functions VNFs can run on virtual machines VMs on top of the hardware networking infrastructure. There can be multiple virtual machines VMs on one hardware box using all hardware resources. A network functions virtualization NFV in a network infrastructure comprises a management, automation and orchestration (MANO) layer. The management, automation and orchestration layer acts as a framework for managing and orchestrating virtual network functions VNFs.

A universal customer premise equipment (uCPE) can comprise software virtual network functions VNFs running on a standard operating system hosted on a server. A uCPE can support a multi-vendor and multi-component infrastructure. In a network infrastructure, there can be two basic use cases. In a data center cloud, the hardware resources are not constrained. In such an environment, it is straightforward to create a new service or virtual network function VNF in the background and then to switch over to the new service. However, in other basic use cases such as edge cloud, hardware resources are constrained so that when a VNF upgrade is performed or a VNF service within a VNF service chain is substituted by another VNF service, a service disruption occurs, i.e. the service is down. In a NFV service chain, the disruption time can be huge while performing operations such as VNF replacement or VNF software upgrade. During the disruption time, the VNF service chain implemented in the NFV network infrastructure cannot be operated or used.

Accordingly, it is an object of the present invention to provide a method for reducing service disruption times for a UCPE in a network functions virtualization, NFV, network infrastructure during a VNF upgrade or VNF replacement.

This object is achieved according to a first aspect by a computer-implemented method comprising the features of claim 1.

The invention provides according to a first aspect a computer-implemented method for reducing service disruption times in a network functions virtualization, NFV, network infrastructure comprising at least one universal customer premise equipment, uCPE, having hardware resources used for running virtual network functions, VNFs, on virtual machines, VMs, wherein in response to a request for substituting an implemented virtual network function, VNF, linked to other virtual network functions, VNFs, in a VNF service chain by another substitution VNF, resource allocation ratios of available hardware resources of the universal customer premise equipment, uCPE, are automatically increased from a default value by oversubscription to provide the hardware resources required for the substitution VNF.

In a possible embodiment of the computer-implemented method according to the first aspect of the present invention, the hardware resources of the universal customer premise equipment, uCPE, to be provided for the substitution VNF comprise hardware disc resources, Random Access Memory, RAM, resources and/or processor resources.

In a possible embodiment of the computer-implemented method according to the first aspect of the present invention, the request for substituting the implemented VNF of the VNF service chain by the substitution VNF is provided by an application of a user equipment, UE, and supplied via the management, automation and orchestration, MANO, layer of the network function virtualization, NFV, network infrastructure to the universal customer premise equipment, uCPE.

In a possible embodiment of the computer-implemented method according to the first aspect of the present invention, the previously implemented VNF linked to the other VNFs in the VNF service chain is removed from the VNF service chain after the substitution VNF has been booted up at a determined boot-up time.

In a possible embodiment of the computer-implemented method according to the first aspect of the present invention, the spin-up time for spinning up the substitution VNF is automatically determined based on the historical usage data indicating usage of hardware resources of the universal customer premise equipment, uCPE, over time.

In a further possible embodiment of the computer-implemented method according to the first aspect of the present invention, after removal of the previously implemented VNF from the VNF service chain, the resource allocation ratios of the hardware resources of the universal customer premise equipment, uCPE, are automatically adjusted back to the default values.

In a further possible embodiment of the computer-implemented method according to the first aspect of the present invention, the resource allocation ratios of available hardware resources are incremented until the required hardware resources are provided.

In a further possible embodiment of the computer-implemented method according to the first aspect of the present invention, the resource allocation ratios of the hard disk resources are incremented up to 1.5.

In a further possible embodiment of the computer-implemented method according to the first aspect of the present invention, the resource allocation ratios of the RAM resources are incremented up to 2.

In a further possible embodiment of the computer-implemented method according to the first aspect of the present invention, the resource allocation ratios of the available processor resources are incremented up to 10.

The invention further provides according to a further aspect a network functions virtualization, NFV, network infrastructure comprising at least one universal customer premise equipment, uCPE, having hardware resources used for running virtual network functions, VNFs, on virtual machines, VMs, wherein in response to a request for substituting an implemented virtual network function, VNF, linked to other virtual network functions, VNFs, in a VNF service chain by another substitution VNF, resource allocation ratios of available hardware resources of the universal customer premise equipment, uCPE, are automatically increased from a default value by oversubscription to provide the hardware resources required by the substitution VNF.

In a possible embodiment of the network functions virtualization, NFV, network infrastructure, the hardware resources of the at least one universal customer premise equipment, uCPE, to be provided for the substitution VNF comprise hard disk resources, Random Access Memory, RAM, resources and/or processor resources.

In a further possible embodiment of the network functions virtualization, NFV, network infrastructure, a request for substituting the implemented VNF of the VNF service chain by the substitution VNF is provided by an application of a user equipment, UE, and supplied via a management, automation and orchestration, MANO, layer of the network functions virtualization, NFV, network infrastructure to the universal customer premise equipment, uCPE.

In a possible embodiment of the network functions virtualization, NFV, network infrastructure, the previously implemented VNF linked to the other VNFs in the VNF service chain is removed automatically from the VNF service chain after the substitution VNF has been booted up at a determined boot-up time.

In a further possible embodiment of the network functions virtualization, NFV, network infrastructure, the spin-up time for spinning up the substitution VNF is automatically determined based on historical usage data indicating usage of hardware resources of the universal customer premise equipment, uCPE, over time.

In a further possible embodiment of the network functions virtualization, NFV, network infrastructure, after removal of the previously implemented VNF from the VNF service chain, the resource allocation ratios of the hardware resources of the universal customer premise equipment, uCPE, are automatically adjusted back to the default values.

In a further possible embodiment of the network functions virtualization, NFV, network infrastructure, the resource allocation ratios of available hardware resources are automatically incremented until the required hardware resources are provided.

In a possible embodiment of the network functions virtualization, NFV, network infrastructure, the resource allocation ratios of the hard disc resources are incremented up to 1.5.

In a further possible embodiment of the network functions virtualization, NFV, network infrastructure, the resource allocation ratios of the Random Access Memory, RAM, resources are incremented up to 2.

In a still further possible embodiment of the network functions virtualization, NFV, network infrastructure, the resource allocation ratios of the processor resources are incremented up to 10.

In the following, possible embodiments of the different aspects of the present invention are described in more detail with reference to the enclosed figures.

Figure 1:
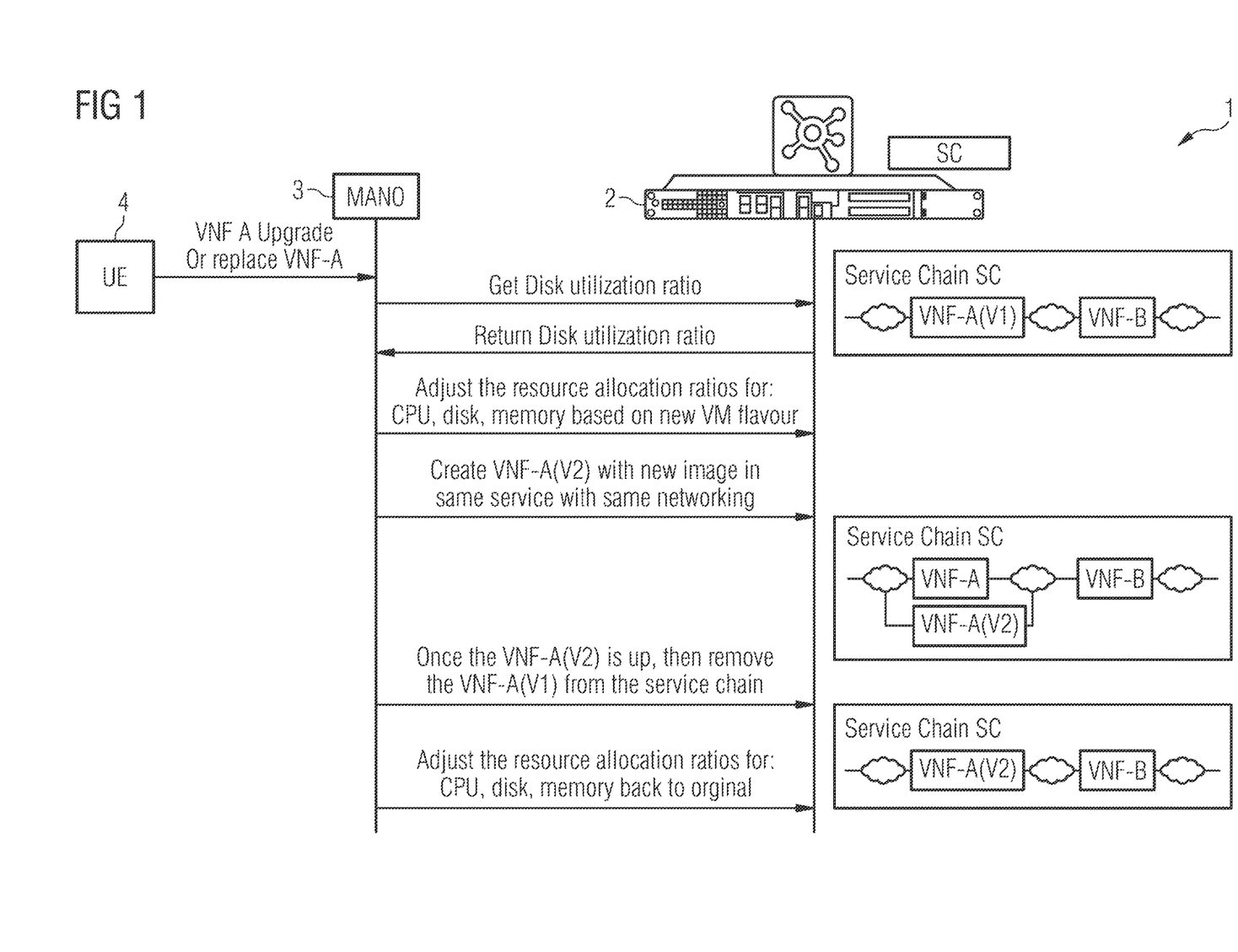
FIG. 1 shows a sequence diagram for illustrating a possible exemplary embodiment of the computer-implemented method according to an aspect of the present invention.

As can be seen in the sequence diagram of FIG. 1, the network functions virtualization, NFV, network infrastructure 1 can comprise at least one universal customer premise equipment, uCPE, 2 having hardware resources used for running virtual network functions VNFs on virtual machines VMs. The universal customer premise equipment, uCPE, 2 comprises in the illustrated exemplary embodiment an edge device 2 with an implemented VNF service chain. The network functions virtualization, NFV, network infrastructure 1 comprises in the illustrated embodiment a management, automation and orchestration, MANO, layer 3 which can receive requests from a user equipment device 4. In response to a request for substituting or upgrading an implemented virtual network function VNF linked to other virtual network functions VNFs in the VNF service chain, resource allocation ratios of available hardware resources in the universal customer premise equipment, uCPE, 2 can be automatically increased from a default value by oversubscription to provide the hardware resources required by the substitution VNF. The hardware resources of the universal customer premise equipment, uCPE, to be provided for the substitution VNF can comprise hardware disc resources, Random Access Memory, RAM, resources or processor resources, i.e. CPU resources. The request for substituting or upgrading an implemented NVF of the VNF service chain by a substitution VNF can be provided by an application of the user equipment 4 and supplied via the management, automation and orchestration, MANO, layer 3 of the network functions virtualization, NFV, network infrastructure 1 to the universal customer premise equipment, uCPE, 2.

The previously implemented VNF linked to the other VNFs in the VNF service chain of the universal customer premise equipment, uCPE, 2 can be removed in a possible embodiment from the VNF service chain after the substitution VNF has been booted up at a determined boot-up time. The boot-up time for booting up the substitution VNF can be automatically determined based on historical usage data indicating usage of hardware resources of the universal customer premise equipment, uCPE, 2 over time. After removal of the previously implemented VNF from the VNF service chain, the resource allocation ratios of the hardware resources within the universal customer premise equipment, uCPE, 2 can be automatically adjusted back to the default values.

In the sequence diagram illustrated in FIG. 1, an application executed on the user equipment 4 can generate a request for upgrading or replacing a virtual network function VNF-A within a VNF service chain implemented on the universal customer premise equipment, uCPE, 2.

In the illustrated example of FIG. 1, the management, automation and orchestration, MANO, layer 3 of the network functions virtualization, NFV, network infrastructure 1 sends an inquiry to the universal customer premise equipment, uCPE, 2 to get a disc utilization ratio, i.e. a resource allocation ratio of the hard disc resources of the uCPE 2. In response to the inquiry, the management, automation and orchestration, MANO, layer 3 gets the disc utilization ratio. In the next step, the management, automation and orchestration, MANO, layer 3 can adjust the resource allocation ratios for different hardware resources of the uCPE 2, i.e. for the processor resources, for the disc resources and memory resources based on a new VM flavor.

In the next step, the management, automation and orchestration, MANO, layer 3 can create the new VNF-A (version V2) according to the request with a new image in the same service with the same networking as also illustrated in FIG. 1.

As soon as the new virtual network function VNF, i.e. the substitution VNF, is up the previously existing VNF-A (version V1) is removed from the VNF service chain.

Finally, the resource allocation ratios for the hardware resources are readjusted back to the original default values.

The computer-implemented method according to the present invention uses the virtualization concept of oversubscription for underlying hardware resources for splitting up redundant or additional VNFs in a resource-constrained environment. In a cloud computing environment, it is possible to overcommit virtual resources on network nodes, in particular on universal customer premise equipment, uCPE, nodes. The network can comprise interrelated components including control diverse, multi-vendor hardware pools of processing, storage and networking resources. This allows to increase the number of instances running on a computation node at the cost of reducing a performance of the respective instances. For instance, the processor resources may use a default CPU allocation ratio of 16:1. The default CPU allocation ratio of 16:1 means that a scheduler can allocate up to 16 virtual cores per physical CPU core. For example, if a physical CPU core has 12 cores the scheduler can see 192 available virtual cores. For a typical flavor definition of 4 virtual cores per instance, this ratio can provide 48 instances on a physical processing node.

Similarly, a default RAM allocation ratio of 1.5:1 means that a scheduler allocates instances to a physical node as long as the total amount of RAM associated with the instances is less than 1.5 times the amount of RAM available on the physical node.

For example, if a physical computation node has 48 Gigabit of RAM, the scheduler allocates instances to that node until the sum of the RAM associated with the instances reaches 72 GB. This can be for example 9 instances in a case where each instance has 8 GB of RAM.

After the cloud resource allocation ratios have been changed, the new substitution VNF can be booted. In a memory overcommitment, there are multiple different ways including host swapping, memory ballooning or TPS.

The universal customer premise equipment, uCPE, 2 can implement a VNF service chain comprising virtual network functions VNFs. These virtual network functions VNFs can include different kinds of networking functions such as routing, switching, network address translation (NAT), access control (ACL), quality of service (QoS), load balancing (LB), security including virtual private networking (VPN) and/or performance monitoring. The network functions virtualization, NFV, network infrastructure 1 provides a computing environment for introduction of new networking techniques or functions.

The universal customer premise equipment, uCPE, 2 of the network functions virtualization, NFV, network infrastructure 1 may comprise a high performance virtual switch or virtual network interface for carrier Ethernet, IP, VXLAN, MPLS or hybrid WAN. Exemplary devices include an FSP 150 ProVMe, an FSB 150-XG304u or an FSB 150-XG118Pro. A FSB 150 ProVMe is a high performance server integrated with hardware-based forwarding, encryption and synchronization engines. The FSB 150-XG304u comprises a flexible uCPE device featuring modules for LTE and VDSL connectivity as well as VNF hosting on a server. The FSB 150-XG118Pro comprises a 10 Gigabit per second programmable cell site gateway featuring a hardware-based synchronization and a modular server.

Figure 2A:
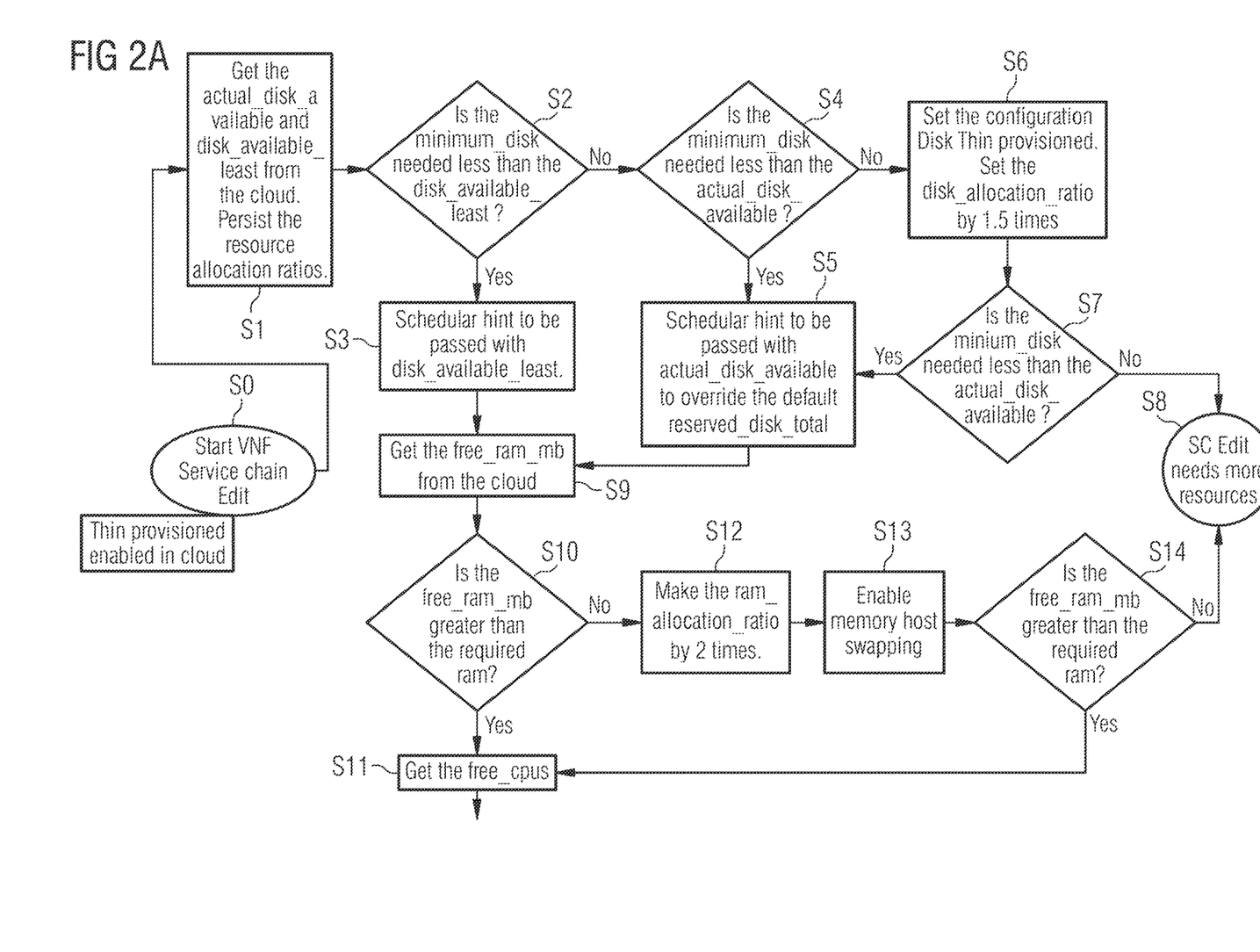
FIGS. 2A, 2B show a flowchart for illustrating a possible exemplary embodiment of a computer-implemented method according to an aspect of the present invention.
Figure 2B:
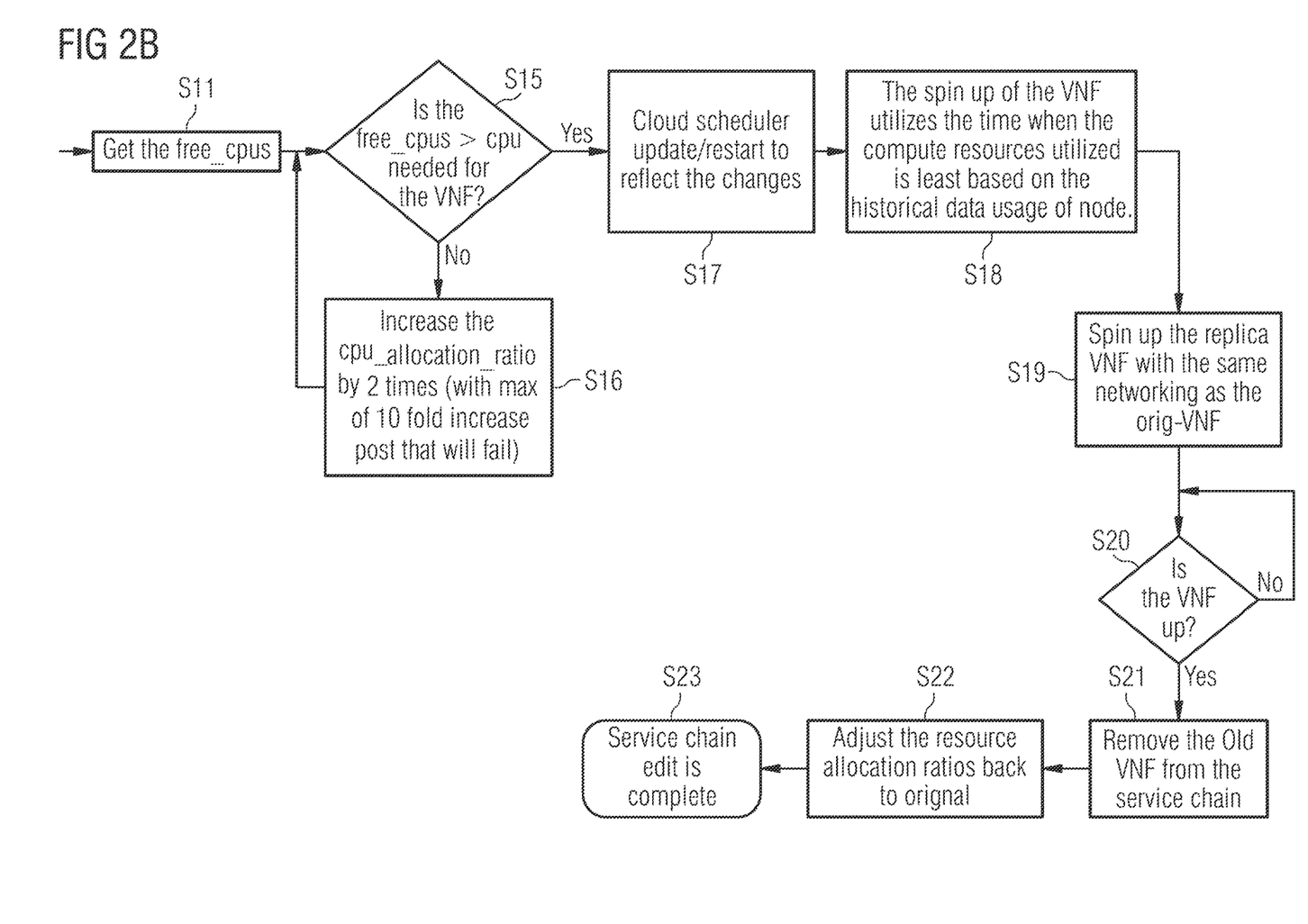

FIGS. 2A, 2B show a flowchart of a possible exemplary embodiment of a computer-implemented method according to an aspect of the present invention. After starting the process in step S0, in step S1 the actual disc available and disc available least is got from the uCPE 2. Further, the resource allocation ratios are persisted. In step S2, it is checked whether the minimum disc needed is less than the disc available least received in step S1. If this is the case, a scheduler hint is passed with the received disc available least. Otherwise, it is checked in step S4, whether the minimum disc needed is less than the actual disc available. If this is the case, then a scheduler hint is passed with the actual disc available to override the default reserved disc total in step S5. Otherwise, in step S6, the configuration disc thin provisioned is set. Further, the disc allocation ratio is set in step S6 by 1.5 times.

In step S7, it is checked whether the minimum disc needed is less than the actual disc available. If this is the case, the process proceeds further with step S5. Otherwise, the service chain SC needs more resources and the process is terminated in step S8.

After having passed the scheduler hints in step S3, S5, one gets the free RAM MB from the cloud in step S9. In step S10, it is checked whether the free RAM MB is greater than the required RAM. If the free RAM MB is greater than the required RAM the free CPUs is got in step S11. In contrast, if the free RAM MB is not greater than the required RAM, the RAM allocation ratio is increased by 2 times in step S12. Following S12, memory host swapping is enabled in step S13. After this, in step S14, it is again checked whether the free RAM MB is greater than the required RAM. If this is the case one gets the free CPUs in step S11. Otherwise, the service chain SC needs more resources and the process is terminated in step S8.

The process continues as illustrated in FIG. 2B. In step S15, it is checked whether the free CPUs exceeds the CPU resources needed for the VNF. If this is not the case the CPU allocation ratio can be increased by 2 times in a possible embodiment in step S16. If the free CPUs are more than the CPU required for the VNF, a cloud scheduler update/restart is performed in step S17 to reflect the changes. In the next step S18, a spin-up of the VNF utilizes a time when the computed resources utilized is least based on a historical data usage of the node. The spin-up time for spinning up the substitution VNF can automatically be determined based on the historical usage data indicating usage of different hardware resources of the universal customer premise equipment, uCPE, 2 over time. The spin-up of the replica new VNF with the same networking as the original previously VNF is performed in step S19.

In step S20, it is waited until the new substitution VNF has been spun up. In the next step S21, the previously implemented VNF is removed automatically from the service chain SC. After removal of the previously implemented VNF from the VNF service chain SC, the resource allocation ratios of the hardware resources of the universal customer premise equipment, uCPE, 2 are automatically adjusted in step S22 back to the default values. The service chain edit is completed in step S23. An operator can be notified by a message or an alarm after the service chain edit operation has been completed.

Historical data of the uCPE device resource usage can be stored in a possible embodiment in an orchestrator layer 3 of the network. An analytic engine of the orchestrator layer 3 can be used to identify a time of a day, when the uCPE device resource usage is minimum. The spin-up of the new substitution VNF is scheduled during a time of the day when the resource usage is minimum as determined with the help of the analytic engine.

Figure 3:
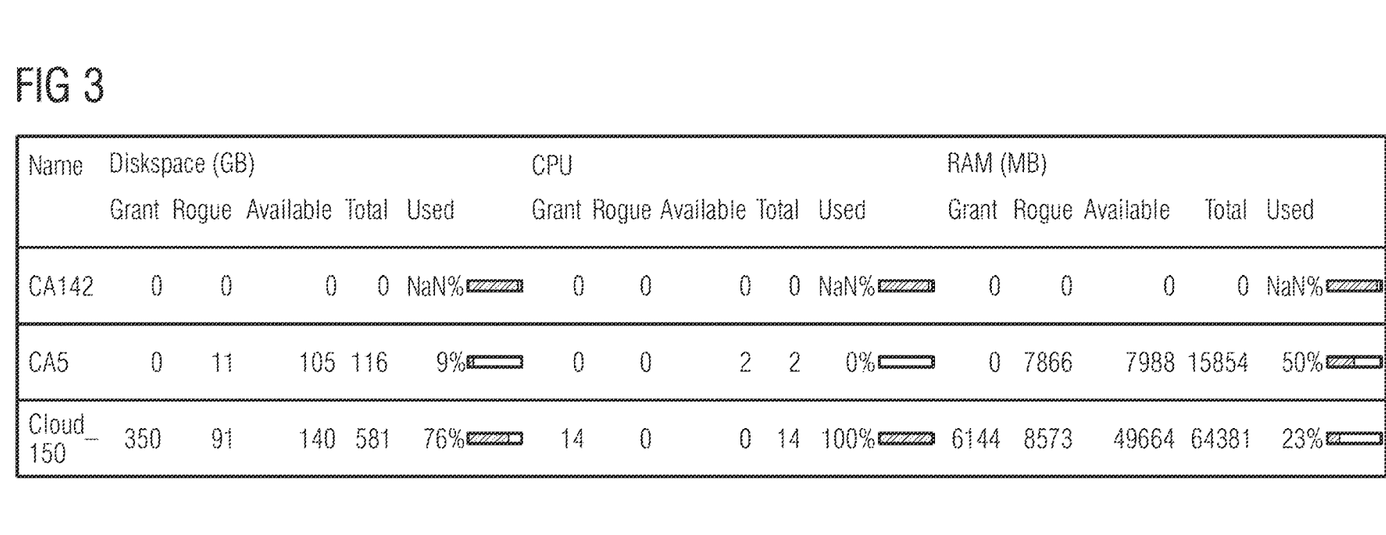
FIG. 3 shows an exemplary hardware resource consumption in a network functions virtualization, NFV, network infrastructure.

FIG. 3 illustrates an example for possible resource consumption as observed by the orchestrator layer 3. For a uCPE device 2, the available CPU may be 14, the available RAM can be 64 Gigabyte and the available storage disc can comprise 581 Gigabyte.

The initial allocation ratios can e.g. be a CPU allocation ratio=1, RAM allocation ratio=1 and disc allocation ratio=1. In the example, the service chain SC implemented on the uCPE device 2 can comprise two virtual network functions VNFs, i.e. a Fortinet VNF and a Vyatta VNF. The Fortinet VNF comprises 2 CPU, 2 Gigabit RAM and 150 Gigabyte disk storage. The Vyatta VNF may comprise 12 vCPU, 4 Gigabit RAM and 200 Gigabyte disk storage.

Figure 4A:
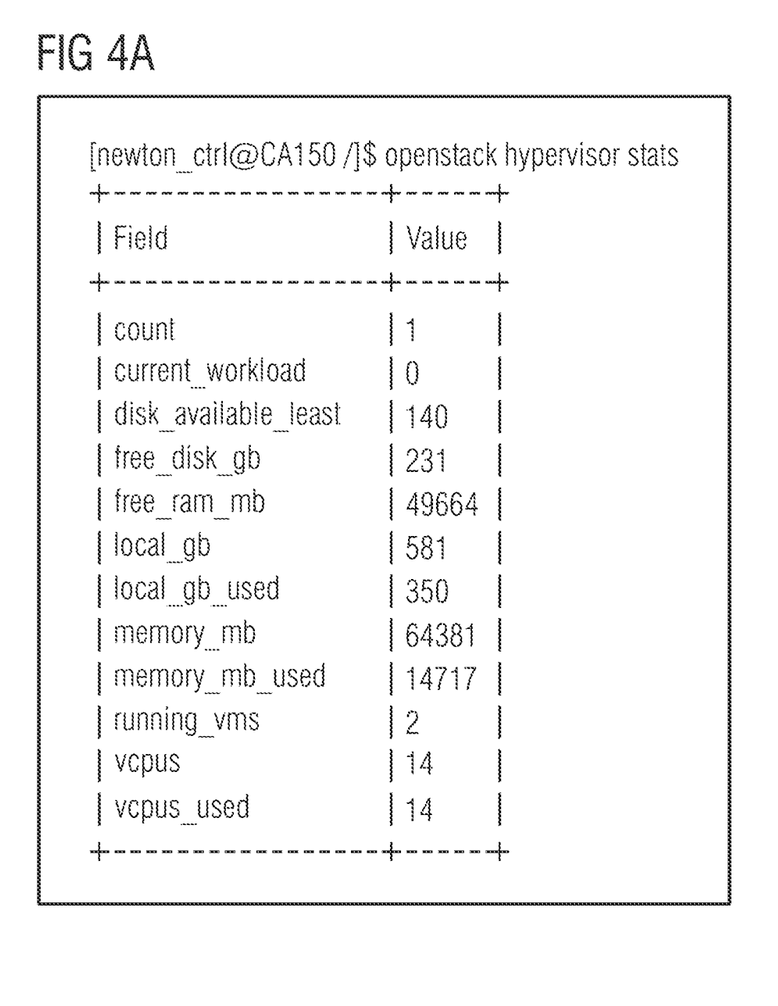
FIG. 4A shows an exemplary cloud resource consumption with an allocation ratio of 1.
Figure 4B:
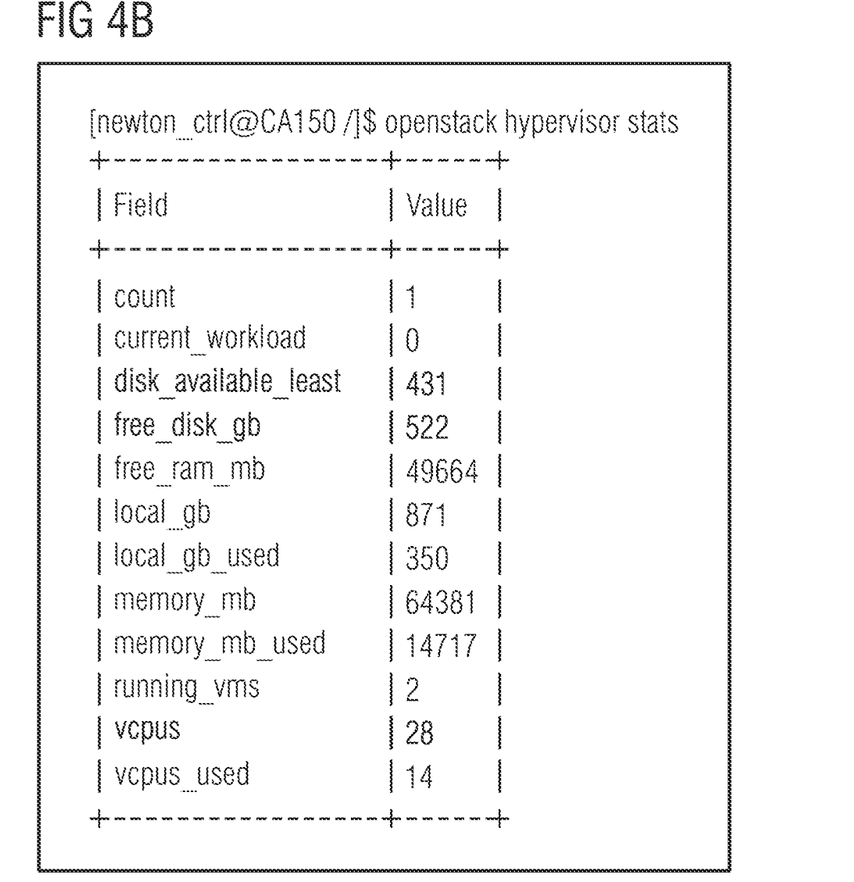
FIG. 4B shows an exemplary cloud resource consumption with incremented allocation ratios.

FIG. 4A illustrates a cloud resource consumption with the allocation ratios set to 1. FIG. 4B illustrates a cloud resource consumption wherein the allocation ratio of the processor resources has been set to 2.0 and for the disc to 1.5. The allocation ratios as illustrated in FIG. 4B are changed from the allocation ratios illustrated in FIG. 4A in a scenario where a VNF function in the VNF service chain SC is upgraded or replaced. For example, if the Fortinet VNF has to be replaced with another version of the Fortinet VNF and the resource allocation can be automatically triggered. For example, the new version of the Fortinet VNF specifies 2 CPU, 2 Gigabit RAM and an increased storage of 250 GB. In a scenario as illustrated in FIG. 3 where no processor resources (i.e. CPUs) are left available in the uCPE device 2 it is necessary to increase automatically the CPU allocation ratio. Further, the disc allocation ratio is also increased for the substitution Fortinet VNF. With the computer-implemented method according to the present invention, it is possible to minimize the service downtimes or upgrade downtimes in such a use case.

The invention claimed is:

1. A computer-implemented method for reducing service disruption times in a network functions virtualization, NFV, network infrastructure comprising at least one universal customer premise equipment (uCPE) having hardware resources used for running virtual network functions (VNFs) on virtual machines (VMs) wherein in response to a request for substituting an implemented virtual network function (VNF) linked to other virtual network functions (VNFs) in a VNF service chain (SC) by another substitution VNF, resource allocation ratios of available hardware resources of the universal customer premise equipment (uCPE) are automatically increased from a default value by oversubscription to provide the hardware resources required by the substitution VNF,
wherein the previously implemented VNF linked to the other VNFs in the VNF service chain (SC) is removed from the VNF service chain (SC) after the substitution VNF has been booted up at a determined boot-up time, and wherein after removal of the previously implemented VNF from the VNF service chain (SC), the resource allocation ratios of the hardware resources of the universal customer premise equipment (uCPE) (2) are automatically adjusted back to the default values.

2. The computer-implemented method according to claim 1,
wherein the hardware resources of the universal customer premise equipment (uCPE) to be provided for the substitution VNF comprise—hard disc resources, - Random Access Memory (RAM) resources and/or processor resources.

3. The computer-implemented method according to claim 1, wherein the request for substituting the implemented VNF of the VNF service chain (SC) by the substitution VNF is provided by an application of a user equipment (UE) and supplied via the management, automation and orchestration (MANO) layer of the network function virtualization (NFV) network infrastructure to the universal customer premise equipment (uCPE).

4. The computer-implemented method according to claim 1,
wherein the spin-up time for spinning up the substitution VNF is automatically determined based on the historical usage data indicating usage of hardware resources of the universal customer premise equipment (uCPE) over time.

5. The computer-implemented method according to claim 1, wherein the resource allocation ratios of available hardware resources are incremented until the required hardware resources are provided.

6. The computer-implemented method according to claim 2, wherein the hard disc resources are incremented up to 1.5, the RAM resources are incremented up to 2, the processor resources are incremented up to 10.

7. A network functions virtualization (NFV) network infrastructure comprising at least one universal customer premise equipment (uCPE) having hardware resources used for running virtual network functions (VNFs) on virtual machines (VMs) wherein in response to a request for substituting an implemented virtual network function, VNF, linked to other virtual network functions (VNFs) in a VNF service chain (SC) by another substitution VNF, resource allocation ratios of available hardware resources of the universal customer premise equipment (uCPE) are automatically increased from a default value by oversubscription to provide the hardware resources required by the substitution VNF,
wherein the previously implemented VNF linked to the other VNFs in the VNF service chain (SC) is removed from the VNF service chain (SC) after the substitution VNF has been booted up at a determined boot-up time, and wherein after removal of the previously implemented VNF from the VNF service chain (SC), the resource allocation ratios of the hardware resources of the universal customer premise equipment (uCPE) (2) are automatically adjusted back to the default values.

8. The network functions virtualization (NFV) network infrastructure according to claim 7, wherein the hardware resources of the universal customer premise equipment (uCPE) to be provided for the substitution VNF comprise hard disc resources, Random Access Memory (RAM) resources and/or processor resources.

9. The network functions virtualization (NFV) network infrastructure according to claim 7, wherein the request for substituting an implemented VNF of the VNF service chain (SC) by a substitution VNF is provided by an application of a user equipment (UE) and supplied via the management, automation and orchestration (MANO) layer of the network function virtualization (NFV) network infrastructure to the universal customer premise equipment (uCPE).

10. The network functions virtualization (NFV) network infrastructure according to claim 7, wherein the spin-up time for spinning up the substitution VNF is automatically determined based on historical usage data indicating usage of hardware resources of the universal customer premise equipment (uCPE) over time.

11. The network functions virtualization (NFV) network infrastructure according to claim 7, wherein the resource allocation ratios of available hardware resources are automatically incremented until the required hardware resources are provided.

\* \* \* \* \*